(12) United States Patent
Butler

(10) Patent No.: US 7,158,289 B1
(45) Date of Patent: Jan. 2, 2007

(54) METHOD AND APPARATUS FOR IMPLEMENTING OPTICAL SUPERVISORY CHANNEL USING BROADBAND NOISE MODULATION

(75) Inventor: David Butler, Richardson, TX (US)

(73) Assignee: Alcatel, Paris (FR)

( * ) Notice: Subject to any disclaimer, the term of this patent is extended or adjusted under 35 U.S.C. 154(b) by 496 days.

(21) Appl. No.: 10/703,802

(22) Filed: Nov. 7, 2003

(51) Int. Cl.
*H01S 3/00* (2006.01)

(52) U.S. Cl. ............... 359/341.4; 398/31; 398/181

(58) Field of Classification Search ........... 359/341.4; 398/30, 31, 181
See application file for complete search history.

(56) References Cited

U.S. PATENT DOCUMENTS

| | | | |
|---|---|---|---|
| 6,111,687 A | 8/2000 | Tammela | |
| 6,404,527 B1 * | 6/2002 | Jensen | 398/177 |
| 6,930,823 B1 * | 8/2005 | Nakamoto et al. | 359/334 |
| 2003/0011855 A1 | 1/2003 | Fujiwara | |

FOREIGN PATENT DOCUMENTS

| | | |
|---|---|---|
| EP | 0 408 905 A2 | 1/1991 |
| EP | 0 415 438 B1 | 11/1996 |
| EP | 1 035 669 A1 | 9/2000 |
| WO | WO 98/27674 | 6/1998 |

* cited by examiner

*Primary Examiner*—Mark Hellner
(74) *Attorney, Agent, or Firm*—Danamraj & Youst, PC; Jessica W. Smith; V. Lawrence Sewell

(57) ABSTRACT

Method and apparatus for implementing optical supervisory channel using broadband noise modulation are described. One embodiment of the present invention is a system for transmitting a supervisory channel from an optical fiber amplifier. The system comprises a first stage amplifier and a noise modulator module. The noise modulator module includes an erbium-doped fiber ("EDF") that receives a pump for exciting the EDF and emits an amplified noise signal and a modulator that modulates the amplified noise signal with a supervisory signal, wherein the modulated noise signal is input back into the first stage amplifier.

32 Claims, 3 Drawing Sheets

METHOD AND APPARATUS FOR IMPLEMENTING OPTICAL SUPERVISORY CHANNEL USING BROADBAND NOISE MODULATION

BACKGROUND OF THE INVENTION

1. Technical Field of the Invention

The present invention generally relates to optical amplifier circuits. More particularly, and not by way of any limitation, the present invention is directed to method and apparatus for implementing an optical supervisory channel in connection with such circuits using broadband noise modulation.

2. Description of Related Art

The laying of new fiber was once the only way to cope with fiber exhaust in optical telecommunications networks. In addition to being labor- and cost-intensive, this "solution" did not enable network operators to provide additional services to customers. In the early 1980s, time-domain multiplexing ("TDM") technology enabled an increase in the bit rate of optical telecommunications networks. With TDM, the capacity of a single fiber was increased by dividing time into small intervals and multiplexing the various signals onto these separate time intervals.

In TDM systems, each optical fiber is capable of transporting an optical signal from a single laser. The optical signal is converted into an electrical signal, electrically reshaped, retimed, and reamplified ("3R regenerated"), and finally transformed back into an optical signal, resulting in additional losses. Wavelength-division multiplexing ("WDM") networks, which enabled the simultaneous transmission of multiple signals of different wavelengths over a single fiber, were deployed in the late 1980s and proved in many cases to be a preferable alternative to TDM.

During the 1990s, WDM networks were developed that enabled up to four different signals to be transmitted over one fiber at different wavelengths within the same optical window. For obvious reasons, this type of WDM network necessitates the use of narrow lasers.

In order to increase the number of services that can be provided, the channel spaces can be moved closer together, creating Dense WDM ("DWDM"). This technology economically increases transport capacity through the utilization of existing fiber routes and terminal equipment.

A DWDM system can be described as a parallel set of optical channels each using a slightly different wavelength, but all sharing a single transmission medium or fiber. In a typical embodiment, various signals are fed to optical transmission modules. The optical output signals are converted to defined wavelengths within a window around a specific wavelength, e.g., 1550 nanometers ("nm"), via suitable wavelength transponders. An optical DWDM coupler then multiplexes these optical signals onto a single fiber and forwards them to an optical fiber amplifier ("OFA"). OFAs work solely in the optical domain, meaning that an optical signal can be amplified without converting the signal to an electrical signal prior to amplification and converting the amplified electrical signal back to an optical signal. Moreover, OFAs perform a 1R (i.e., optical reamplification) regeneration, as apposed to a 3R regeneration, as discussed above, and simultaneously amplify each wavelength of a DWDM signal without requiring the signal to be demultiplexed before and then remultiplexed after amplification. A major advantage of OFAs is their transparency to signal speed and data type.

One of the more common types of OFAs currently in use is the Erbium-Doped Fiber Amplifier ("EDFA"), which comprises a section of optical fiber doped with erbium ions. Radiation from a pump laser outside the data wavelength range is coupled into the fiber to amplify the data signal. Specifically, in one embodiment, a data signal input to the OFA is provided to a wavelength combiner via an optical isolator, a function of which is to attenuate reflections. An input signal detector after the optical isolator detects the level of the input signal and generates an electrical signal corresponding to this level. A pump laser supplies a second input to the wavelength combiner. The pump laser produces light whose wavelength is e.g., 980 or 1480 nm, whereas the wavelength of the light of the signal to be amplified is 1550 nm, for example. The photons of the pump laser are conducted to the erbium-doped fiber where they excite erbium atoms of the fiber. Some of the erbium atoms return to the ground state via spontaneous emission. When the photons of the light of the signal to be amplified are directed to the erbium atom excited by the photons of the pump laser, the erbium atom emits a photon corresponding to the photon of the signal light.

As previously indicated, a side-effect of the amplification of an optical signal using an EDFA is the spontaneous emission of photons, which are in turn amplified, adding to the noise. The resulting spurious signal is known as Amplified Spontaneous Emission ("ASE").

As an OFA amplifies a signal by a given factor, without adding information to the signal, signaling associated with supervision and control for the amplifier generally has to be carried out separately. One technique for accomplishing this has been to transmit supervisory messages by modulating the control signal of a pump laser unit in such a manner that the pumping light contains a supervisory signal to be transmitted. This technique suffers from the disadvantage that it requires two separate optical systems to be employed—one for receiving a payload signal and one for receiving the supervisory signal. Additionally, it can only be used in connection with frequencies that have a period longer than the lifetime of the fluorescence state.

Another technique has been to modulate a separate optical wavelength (e.g. 1510 nm or 1565 nm) to carry the supervisory and control information. This technique is relatively costly and sometimes requires wavelength converters to shift the supervisory channel from one part of the spectrum to another in cases in which Raman amplifiers or L/C band couplers are used. Yet another technique has been to use the Forward Error Correction ("FEC") overhead bytes to carry the supervisory signal. This technique require access to the FEC framer at each side, which may present problems.

SUMMARY OF THE INVENTION

One embodiment of the present invention is a system for transmitting a supervisory channel from an optical fiber amplifier disposed on an optical path. The system comprises a gain stage amplifier and a noise modulator module. The noise modulator module includes an erbium-doped fiber ("EDF") that receives a pump for exciting the EDF and emits an amplified noise signal and a modulator that modulates the amplified noise signal with a supervisory signal, wherein the modulated noise signal is input back into the optical path.

Another embodiment is a system for transmitting a supervisory channel from an optical fiber amplifier. The system comprises a first amplifier stage; a second amplifier stage having an input connected to an output of the first amplifier stage; and a noise modulator module. The noise modulator module includes an erbium-doped fiber ("EDF") that receives a pump for exciting the EDF and emits an amplified noise signal and a modulator that modulates the amplified noise signal with a supervisory signal, wherein the modulated noise signal is input to the first amplifier stage.

Another embodiment is an apparatus for transmitting a supervisory channel from an optical fiber amplifier, the optical fiber amplifier comprising a first amplifier stage and a second amplifier stage having an input connected to an output of the first amplifier stage. The apparatus comprises means for using the residual pump at the input of the second amplifier stage to produce an amplified noise signal; means for modulating the amplified noise signal with a supervisory signal; and means for inputting the modulated noise signal to the first amplifier stage.

Another embodiment comprises a method of transmitting a supervisory channel from an optical fiber amplifier, the optical fiber amplifier comprising a first amplifier stage and a second amplifier stage having an input connected to an output of the first amplifier stage. The method comprises using the residual pump at the input of the second amplifier stage to produce an amplified noise signal; modulating the amplified noise signal with a supervisory signal; and inputting the modulated noise signal to the first amplifier stage.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
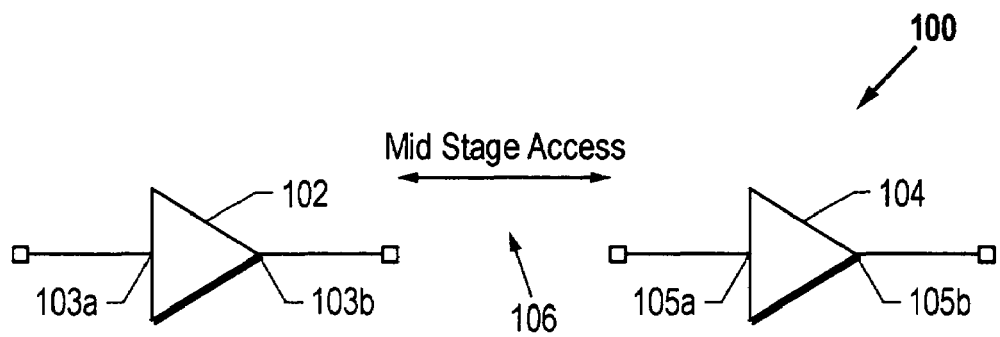
FIG. 1 is a schematic block diagram of an embodiment of a two-stage EDFA configuration generally used for transmission system post amplifiers and in-line booster amplifiers.

In the drawings, like or similar elements are designated with identical reference numerals throughout the several views thereof, and the various elements depicted are not necessarily drawn to scale.

FIG. 1 is a schematic block diagram of an embodiment of a two-stage EDFA configuration 100 generally used for transmission system post amplifiers and in-line booster amplifiers. As shown in FIG. 1, the configuration 100 comprises a first stage 102, which includes an input 103a and an output 103b, and a second stage 104, which includes an input 105a and an output 105b, with a mid-stage access portion 106 disposed therebetween. Typically, the first stage 102 is a low-noise 980 nm pumped EDFA while the second stage is a counter-pumped 1480 nm gain stage. Residual 1480 nm pump power is present exiting the second stage input 105a.

It will be recognized that the configuration 100 includes two stages because a low noise amplifier will typically not provide a high saturated output power, while an amplifier with a high saturated output will not have an acceptable noise figure. Combining the two types of amplifiers as illustrated in FIG. 1 results in an amplifier that has both a good noise figure and a high saturated output power. As a side benefit, a two-stage configuration allows access to the fiber in between the two stages via the mid-stage access portion 106. The primary function of the mid-stage access portion 106 is as a location at which to connect a variable attenuator that an be used to adjust the spectral tilt of the combined amplifier to compensate for different input and output levels. The mid-stage access portion 106 can also be used as a place to connect monitors, for example, and as long as too much loss is not added, there will be a negligible impact on the operation of the amplifier.

Figure 2:
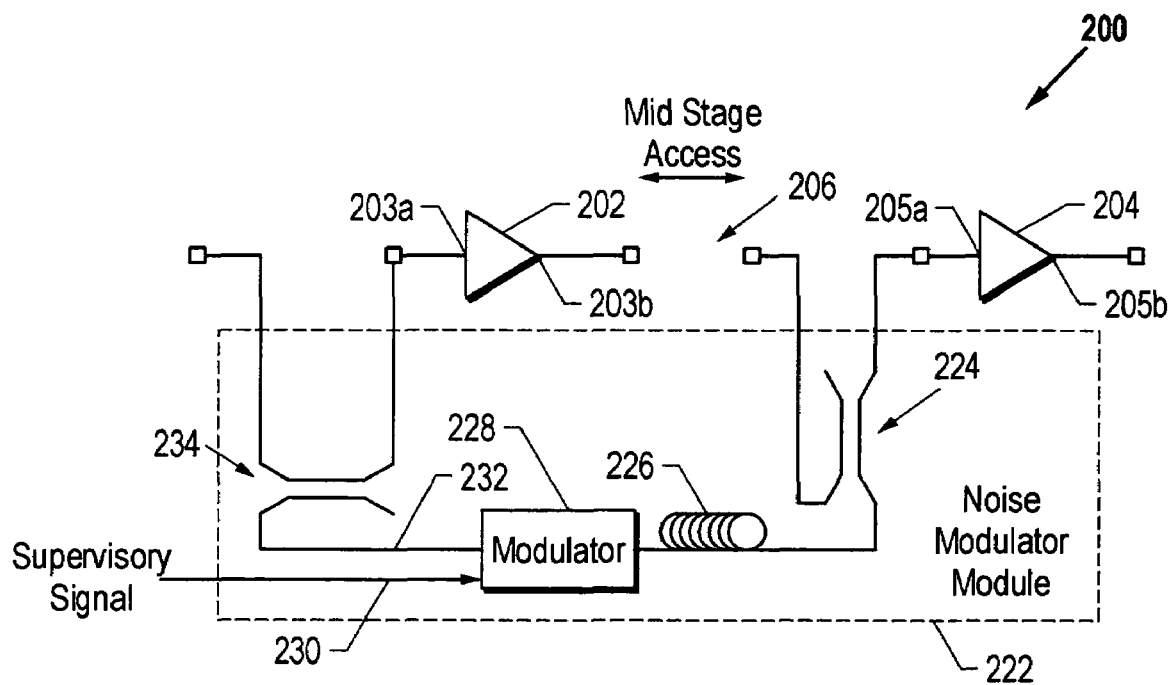
FIG. 2 is a schematic block diagram of one embodiment of a two-stage EDFA configuration for implementing an optical supervisory channel using broadband noise modulation.

FIG. 2 is a schematic block diagram of one embodiment of a two-stage EDFA configuration 200 for implementing an optical supervisory channel using broadband noise modulation. Similar to the configuration 100 shown in FIG. 1, the configuration 200 includes a first stage 202, which includes an input 203a and an output 203b, and a second stage 204, which includes an input 205a and an output 205b, with a mid-stage access portion 206 disposed therebetween. The first stage 202 is a low-noise 980 nm pumped EDFA while the second stage is a counter-pumped 1480 nm gain stage. As previously described, residual 1480 nm pump power is present exiting the second stage input 205a. It should be noted that, although the embodiment shown in FIG. 2 is described as implementing the second stage 204 using a 1480 nm pumped gain stage, amplifiers having other pump wavelengths, such as a 980 nm EDFA, may be used. Unlike the configuration 100, the configuration 200 also includes a noise modulator module 222 connected between the first stage input 203a and the second stage input 205a.

The noise modulator module 222 includes a 1550/1480 wavelength division multiplex ("WDM") coupler 224, which filters off the residual 1480 nm pump power. The filtered residual power is then used to excite a length of erbium-doped fiber ("EDF") 226. The EDF 226 emits broadband amplified spontaneous emission noise in the 1550 nm window, which is input to a modulator 228 and modulated with a supervisory signal input to the modulator on a line 230. The modulated noise signal output from the modulator 228 on a line 232 is fed back to the input 203a of the first stage 202 via, e.g., a skew coupler 234 and is transmitted on to the far end of the transmission system. The modulated noise is broadband and therefore passes through C/L band couplers and Raman amplifiers. The supervisory modulation rate is low compared to the traffic data rate and therefore the supervisory signal may be recovered by sampling the noise at the receiver using a comparatively narrow optical filter.

It should be noted that a pump source other than the residual pump from the second stage 204 may be used to excite the noise modulator module 222. In particular, it is anticipated that an external pump source or the residual pump from the first stage 202 may be used for this purpose.

Figure 3:
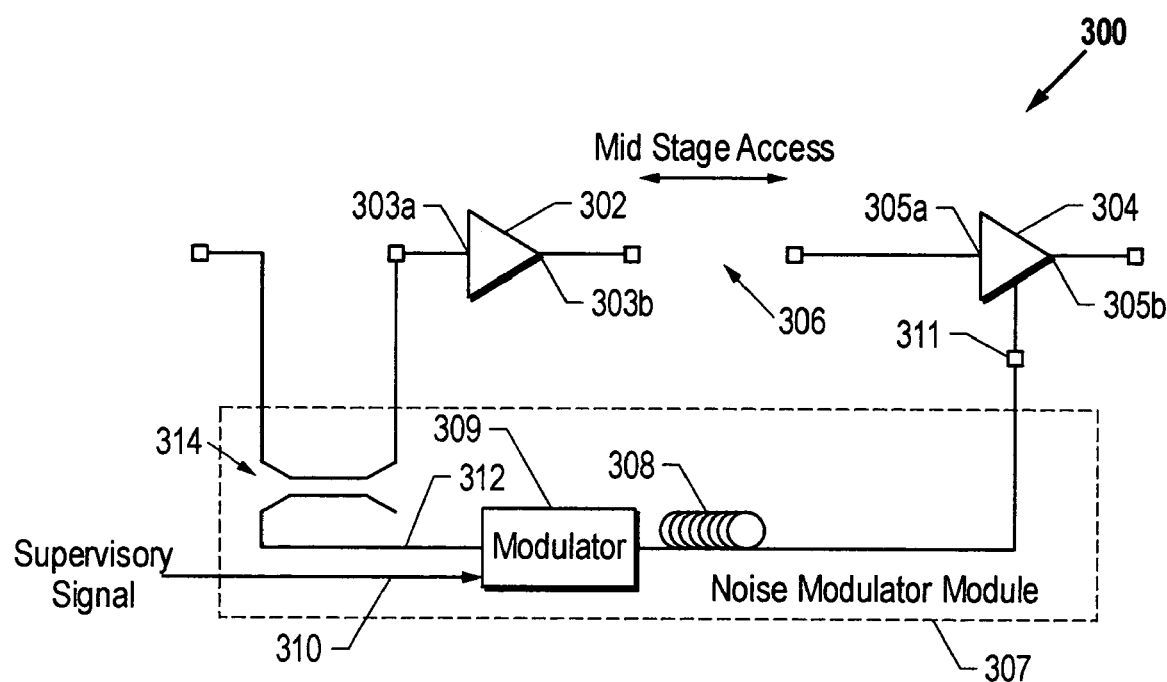
FIG. 3 is a schematic block diagram of another embodiment of a two-stage EDFA configuration for implementing an optical supervisory channel using broadband noise modulation.

Some amplifiers include a 1480/1550 nm WDM coupler on the input to the second stage to allow an external pump module to be used. FIG. 3 is a schematic block diagram of another embodiment of a two-stage EDFA configuration 300 for implementing an optical supervisory channel using broadband noise modulation designed for use with such an amplifier.

Similar to the configuration 100 shown in FIG. 1, and the configuration 200 shown in FIG. 2, the configuration 300 includes a first stage 302, which includes an input 303a and an output 303b, and a second stage 304, which includes an input 305a and an output 305b, with the mid-stage access portion 306 disposed therebetween. The first stage 302 is a low-noise 980 nm pumped EDFA while the second stage is a counter-pumped 1480 nm gain stage. In the embodiment illustrated in FIG. 3, the second stage 304 includes an external pump input 311 to which an external pump (not shown) may be connected. In this embodiment, residual 1480 nm pump power is present exiting the external pump input 311. Similar to the configuration 200, the configuration 300 also includes a noise modulator module 307 connected between the first stage input 303a and the second stage input 305a.

The filtered residual power present at the external pump input 311 is then used to excite a length of erbium-doped fiber ("EDF") 308 of the noise modulator 307. The EDF 308 emits broadband amplified spontaneous emission noise in the 1550 nm window, which is input to a modulator 309 and modulated with a supervisory signal input to the modulator on a line 310. The modulated noise signal output from the modulator 309 on a line 312 is fed back to the input 103a of the first stage 102 via, e.g., a skew coupler 314, and is transmitted on to the far end of the transmission system. Again, the modulated noise is broadband and therefore passes through C/L band couplers and Raman amplifiers. The supervisory modulation rate is low compared to the traffic data rate and therefore the supervisory signal may be recovered by sampling the noise at the receiver using a comparatively narrow optical filter.

Figure 4:
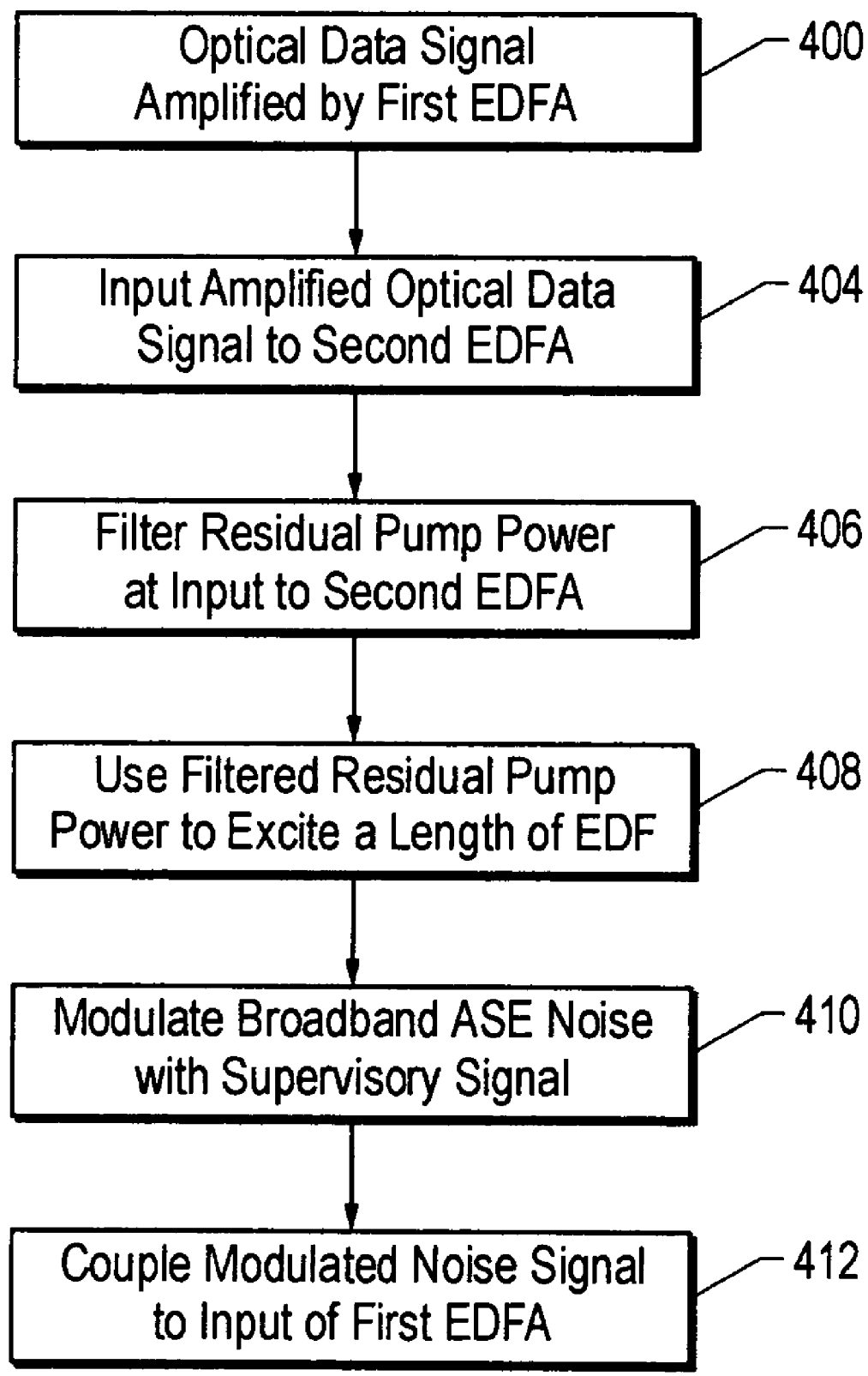
FIG. 4 is a flowchart of the operation of the embodiment illustrated in FIG. 2.

FIG. 4 is a flowchart illustrating operation of an embodiment of the present invention, such as the embodiment illustrated in FIG. 2. In step 400, an optical data signal input to a first EDFA comprising a low-noise 980 nm pumped EDFA is amplified. In step 404, the amplified optical data signal is input to a second EDFA comprising a counter-pumped 1480 nm gain stage. In step 406, a WDM coupler connected to the input of the second EDFA filters off the residual pump power exiting the input of the second EDFA. In step 408, the filtered residual pump power is used to excite a length of EDF. In step 410, broadband ASE noise emitted by the length of EDF is modulated with a supervisory signal. In step 412, a modulated noise signal output from the modulator is coupled back to the input of the first EDFA, e.g., via a skew coupler.

Based upon the foregoing Detailed Description, it should be readily apparent that the present invention advantageously provides a method and apparatus for the transmission of supervisory information and engineering orderwire information over an optical transmission path. In particular, the embodiments can be implemented using existing EDFA designs without requiring modification thereof. Additionally, because the modulation is broadband but the signal can be recovered only from a narrow optical band, the embodiments are independent of Raman amplifiers and C/L band couplers in the transmission line. Finally, the embodiments do not require the use of expensive electro-optic semiconductors.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims. For example, amplifiers having pump wavelengths other than those described above may be used to implement the first stage 202 and the second stage 204. Moreover, the source of the pump used to excite the noise modulator module 222 may be other than the residual pump from the second stage 204.

What is claimed is:

1. A system for transmitting a signal of a supervisory channel from an optical fiber amplifier disposed on an optical path, the system comprising:
    a gain stage amplifier; and
    a noise modulator module comprising:
        an erbium-doped fiber ("EDF") that receives a pump for exciting the EDF and emits an amplified noise signal; and
        a modulator that modulates the amplified noise signal with a supervisory signal, wherein the modulated noise signal is input back into the optical path.

2. The system of claim 1 wherein the pump for exciting the EDF is output from an external pump input of the gain stage amplifier.

3. The system of claim 1 wherein the gain stage amplifier is a counter-pumped 1480 nanometer gain amplifier.

4. The system of claim 1 wherein the gain stage amplifier is an EDF amplifier.

5. The system of claim 1 wherein the noise modulator module further comprises a Wavelength Division Multiplex ("WDM") coupler for coupling the pump with the EDF.

6. The system of claim 1 further comprising a low-noise amplifier having an output connected to an input of the gain stage amplifier, wherein the modulated noise signal is input back into the optical path via the low-noise amplifier.

7. The system of claim 6 wherein the pump for exciting the EDF is provided from the gain stage amplifier input.

8. The system of claim 6 wherein the low-noise amplifier comprises a 980 nanometer pumped amplifier.

9. The system of claim 6 wherein the low-noise amplifier comprises an EDF amplifier.

10. The system of claim 6 wherein the noise modulator module further comprises a skew coupler for coupling the modulated noise signal to an input of the low-noise amplifier.

11. The system of claim 6 wherein a source of the pump for exciting the EDF is selected from a group consisting of a residual pump from the gain stage amplifier, an external pump source, and a residual pump from the low noise amplifier.

12. A system for transmitting a signal of a supervisory channel from an optical fiber amplifier, the system comprising:
    a first amplifier stage;
    a second amplifier stage having an input connected to an output of the first amplifier stage; and
    a noise modulator module comprising:
        an erbium-doped fiber ("EDF") that receives a pump for exciting the EDF and emits an amplified noise signal; and
        a modulator that modulates the amplified noise signal with a supervisory signal, wherein the modulated noise signal is input to the first amplifier stage.

13. The system of claim 12 wherein the pump for exciting the EDF is provided from the second amplifier stage input.

14. The system of claim 12 wherein the pump for exciting the EDF is provided from an external pump input of the second amplifier stage.

15. The system of claim 12 wherein the second amplifier stage comprises a counter-pumped 1480 nanometer gain EDF amplifier.

16. The system of claim 12 wherein the first amplifier stage is a low-noise 980 nanometer pumped EDF amplifier.

17. The system of claim 12 wherein the pump for exciting the EDF is coupled to the EDF using a Wavelength Division Multiplex ("WDM") coupler.

18. The system of claim 12 wherein the modulated noise signal is coupled to the input of an input of the first amplifier stage using a skew coupler.

19. The system of claim 12 wherein a source of the pump for exciting the EDF is selected from a group consisting of a residual pump from the first amplifier stage, a residual pump from the second amplifier stage, and an external pump source.

20. Apparatus for transmitting a signal of a supervisory channel from an optical fiber amplifier, the optical fiber amplifier comprising a first amplifier stage and a second amplifier stage having an input connected to an output of the first amplifier stage, the apparatus comprising:
means for using a residual pump at an input of the second amplifier stage to produce an amplified noise signal;
means for modulating the amplified noise signal with a supervisory signal; and
means for inputting the modulated noise signal to the first amplifier stage.

21. The apparatus of claim 20 wherein the means for amplifying comprises an erbium-doped fiber ("EDF") coupled to the second stage amplifier input.

22. The apparatus of claim 21 wherein the amplifying means is coupled to the second stage amplifier input via a Wavelength Division Multiplex ("WDM") coupler.

23. The apparatus of claim 20 wherein the first amplifier stage comprises a low-noise 980 nanometer pumped amplifier and the second amplifier stage comprises a counter-pumped 1480 nanometer gain amplifier.

24. The apparatus of claim 20 wherein each of the first and second amplifier stages are implemented using an EDF amplifier.

25. The apparatus of claim 20 wherein the means for inputting comprises a skew coupler for coupling an output of the means for modulating with an input of the first amplifier stage.

26. A method of transmitting a signal of a supervisory channel from an optical fiber amplifier, the optical fiber amplifier comprising a first amplifier stage and a second amplifier stage having an input connected to an output of the first amplifier stage, the method comprising:
using a residual pump at an input of the second amplifier stage to produce an amplified noise signal;
modulating the amplified noise signal with a supervisory signal; and
inputting the modulated noise signal to the first amplifier stage.

27. The method of claim 26 wherein the amplifying further comprises coupling an erbium-doped fiber ("EDF") to the second stage amplifier input.

28. The method of claim 27 wherein the amplifying further comprises coupling an erbium-doped fiber ("EDF") to the second stage amplifier input via a Wavelength Division Multiplex ("WDM") coupler.

29. The method of claim 28 wherein the amplifying further comprises exciting photons of the EDF using the pump.

30. The method of claim 26 wherein the first amplifier stage comprises a low-noise 980 nanometer pumped amplifier and the second amplifier stage comprises a counter-pumped 1480 nanometer gain amplifier.

31. The method of claim 26 wherein each of the first and second amplifier stages are implemented using an EDF amplifier.

32. The method of claim 26 wherein the inputting the modulated noise signal comprises coupling an output of the modulator with an input of the first amplifier stage.

* * * * *